United States Patent [19]
Kolawa et al.

[11] Patent Number: 5,860,011
[45] Date of Patent: Jan. 12, 1999

[54] METHOD AND SYSTEM FOR AUTOMATICALLY CHECKING COMPUTER SOURCE CODE QUALITY BASED ON RULES

[75] Inventors: Adam K. Kolawa, Sierra Madre; Michael A. G. Aivazis, Pasadena; Wendell T. Hicken, Whittier, all of Calif.; Bryan R. Strickland, Raleigh, N.C.

[73] Assignee: Parasoft Corporation, Monrovia, Calif.

[21] Appl. No.: 609,910

[22] Filed: Feb. 29, 1996

[51] Int. Cl.⁶ ........................................ G06F 9/44
[52] U.S. Cl. .............................................. 395/708
[58] Field of Search ............................... 395/708

[56] References Cited

U.S. PATENT DOCUMENTS

| | | | |
|---|---|---|---|
| 5,293,629 | 3/1994 | Conley | 395/708 |
| 5,390,325 | 2/1995 | Miller | 395/183.14 |
| 5,490,249 | 2/1996 | Miller | 395/183.14 |
| 5,583,988 | 12/1996 | Crank | 395/183.14 |
| 5,630,127 | 5/1997 | Moore | 395/615 |
| 5,652,835 | 7/1997 | Miller | 395/183.14 |
| 5,652,882 | 7/1997 | Doktor | 395/617 |

OTHER PUBLICATIONS

Bailey, "C++ SoftBench CodeAdvisor 5.0," SoftBench Insights, Hewlett–Packard, Dec. '95, pp. 5–6.

Meyers "Effective C++ 50 Specific Ways to Improve Your Programs and Designs," p. xi (Addison–Wesley 1992).

*Primary Examiner*—James P. Trammell
*Assistant Examiner*—John P. Chavis
*Attorney, Agent, or Firm*—Christie, Parker & Hale, LLP

[57] ABSTRACT

A method and system for automatically checking the quality of computer source code based on rules for identifying quality concerns. The computer source code comprises instructions for execution on the computer. Each of the instructions are represented by at least one node stored in a parse tree. Both the parse tree and the rules are stored in the computer. A violation of one of the rules is checked by examining each of the instructions as represented by nodes in the parse tree. An error message for describing the quality concern identified is generated whenever such a rule violation is found in the computer source code.

13 Claims, 6 Drawing Sheets

Microfiche Appendix Included
(2 Microfiche, 115 Pages)

METHOD AND SYSTEM FOR AUTOMATICALLY CHECKING COMPUTER SOURCE CODE QUALITY BASED ON RULES

REFERENCE TO MICROFICHE APPENDIX

A microfiche appendix is part of the specification which includes two microfiche and 115 frames.

A portion of the disclosure of this patent document contains material to which a claim of copyright is made. The copyright owner has no objection to the facsimile reproduction by anyone of the patent document or patent disclosure, as it appears in the Patent and Trademark Office patent file or records, but reserves all other copyright rights whatsoever.

FIELD OF THE INVENTION

The present invention relates to a method and system for automatically checking computer source code quality and, in particular, to a method and system for automatically checking computer source code quality based on rules.

BACKGROUND OF THE INVENTION

The problem of writing error-free computer programs has plagued programmers since the very beginning. Sophisticated schemes for automatically ferreting out program errors and bugs of all kinds, including lexical, syntactic, semantic and logical, have been developed. However, these schemes have generally been directed to enforcing adherence to concrete programming standards inherent in the definition of the programming language itself and not to more extrinsic quality-related concerns, such as language evolution, portability, testing costs and language-specific feature exploitation. Many of these quality-related concerns can be expressed as rules amenable to automated implementation.

The first of these quality-related concerns is caused by the inevitable evolution of programming languages through the extension of features or the introduction of an entirely new language superset. For example, the C++ programming language is by design a superset of the C programming language to make it more accessible to the large number of existing C language programmers. The problem with language evolution is that programmers familiar with the original language often cling to the same old programming practices more out of habit than good sense. Moreover, features formerly preferred have sometimes been refined or replaced by new features in the successor language, yet are largely ignored in favor of the old.

Another concern is portability. Experienced programmers are generally aware of the horizontal portability concerns for different target computing platforms. However, vertical portability concerns relating to the migration of language features to a standardized version of the language, such as an ANSI/ISO standard, are easily overlooked, especially when a compiler fails to implement or acknowledge the proposed standardized features.

A third concern is avoiding unnecessary software testing which is labor intensive and accounts for approximately 50 percent of commercial software development costs. Often, the need to test software is caused by poor or inefficient programming practices. A more disciplined programming style would help diminish testing costs in many cases.

Finally, a concurrent concern to language evolution is a need to fully exploit the language-specific features of the chosen programming language. For instance, two features of the C++ programming language are strong type safety and extensibility, features formerly unavailable in the C language. Even seasoned C language programmers can sometimes overlook these features.

Other quality-related problems are caused by inexperience or lack of exposure to other programmers. As in most disciplines, knowledge of a preferred solution to a commonly encountered problem is generally passed from programmer to programmer in the time-honored oral tradition. This also means that a programmer will only grow insofar as he is able to obtain exposure to other programmers. It is unlikely a lone programmer will quickly adopt a new solution to a solved problem absent some guidance from a sage source.

One system for checking software based on rules is embodied in a computer program called lint++, as described in S. Meyers, *Effective C++ 50 Specific Ways to Improve Your Programs and Designs,* p. xi (Addison-Wesley 1992), the disclosure of which is incorporated herein by reference. However, this system only focuses on the particular software constructs for the C++ programming language and does not formalize a great majority of the guidelines used by experienced programmers.

Another system for checking software based on rules is embodied in a computer program product called CodeAdvisor, manufactured by Hewlett-Packard Company, Palo Alto, Calif., and described in E. Bailey, *C++ SoftBench CodeAdvisor 5.0, SoftBench Insights,* pp. 5–6 (Dec. 1995), the disclosure of which is incorporated herein by reference. However, this system also only focuses on the particular software constructs for the C++ programming language and requires rules that are reliant on detailed source code information stored in a static database.

Therefore, what is needed is a system and method for automatically checking source code quality based on rules of programming style and technique. Such a system and method would operate beyond the boundaries of the raw programming language definition and impart expert programming language knowledge by applying rules embodying extrinsic quality-related concerns, such as language evolution, portability, testing costs and language-specific feature exploitation. Preferably, such a system and method would incorporate error message outputting and global and specific rule suppression features.

SUMMARY OF THE INVENTION

Accordingly, the present invention enables the above problems to be overcome by providing a method and system for automatically checking computer source code quality based on rules.

An embodiment of the present invention is a method and system for automatically checking the quality of computer source code based on rules for identifying quality concerns. The computer source code comprises instructions for execution on the computer. Each of the instructions are represented by at least one node stored in a parse tree. Both the parse tree and the rules are stored in the computer. A violation of one of the rules is checked by examining each of the instructions as represented by nodes in the parse tree. An error message for describing the quality concern identified is generated whenever such a rule violation is found in the computer source code.

A further embodiment of the present invention is a method using a computer for checking computer source code to identify violations of quality rules. The computer source code comprises instructions for execution on the computer. Each quality rule comprises a set of node types. Both the computer source code and the quality rules are stored in the computer. The instructions for the computer source code are provided to the computer stored in a parse tree comprising at least one node having a node type for each instruction. Such a quality rule is selected for identifying whether the selected quality rule has been violated by the computer source code. The parse tree is searched for a match between such a node in the parse tree having a node type that matches such a node type in the set of node types for the selected quality rule. An error message is generated for describing the violation for the selected quality rule.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DETAILED DESCRIPTION

I. System For Automatically Checking Computer Source Code Quality

A. System Structure

Figure 1:
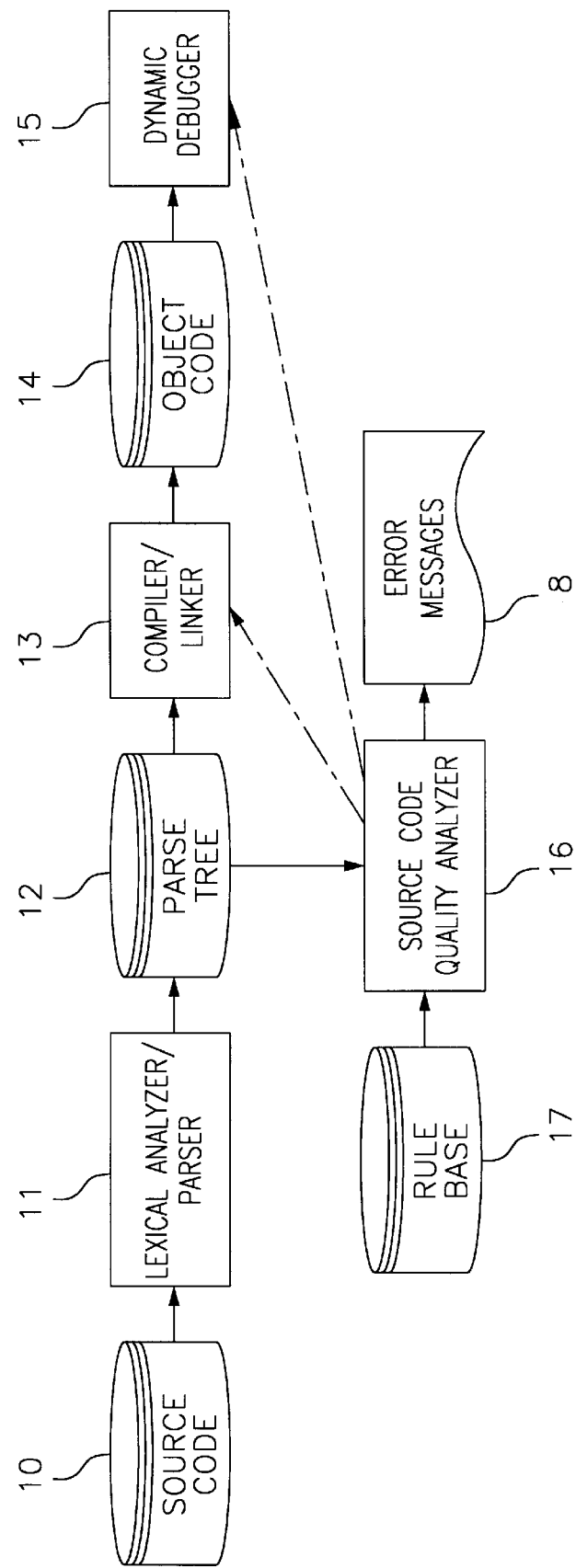
FIG. 1 is a functional block diagram of a system for automatically checking computer source code quality constructed in accordance with the present invention.

Referring to FIG. 1, a functional block diagram of a system for automatically checking computer source code quality constructed in accordance with the present invention is shown. The source code 10 is preferably organized into files which are stored on a secondary storage device (not shown). The source code 10 contains a series of programming language instructions. In the described embodiment, the C++ and LISP programming languages are supported, although support of other programming languages is feasible.

The source code 10 comprises all types of files used to express an uncompiled, that is, non-object code, computer program, including definitional and declarative files. For example, in the C++ programming language, header files are declarative files since they frequently declare but do not define program variables, structures, functions and classes. Source code files, however, are definitional files since they typically contain definitions of program variables, structures, functions and classes.

The source code 10 is read as input to a lexical analyzer/parser 11 which is conventional in the art. The lexical analyzer scans the source code 10 and groups the instructions into tokens. The parser performs a hierarchical analysis which groups the tokens into grammatical phrases that are represented by a parse tree 12. The parse tree 12 is preferably organized into files which are stored on a secondary storage device (not shown). Each instruction is represented in the parse tree 12 by at least one node with interconnecting paths representing dependencies between each token. A root node indicates the entry point into the parse tree. Each node also is of a particular type, such as PLUS_EXPR which is an addition expression node. The computer source code for the node types used in the described embodiment is set forth in the microfiche appendix.

The parse tree 12 is read by both a compiler/linker 13 and source code quality analyzer 16. The compiler/linker 13 transforms the parse tree 12 into executable object code 14 and is conventional in the art. The compiler translates the grammatical phrases stored in the parse tree 12 into individual object modules (not shown) which the linker links and combines with external library function modules (not shown) to create object code 14. The object code 14 is preferably organized into files which are stored on a secondary storage device (not shown).

The resulting executable computer program, as embodied in the object code 14, can be dynamically tested with the dynamic debugger 15 for identifying runtime errors. The dynamic debugger is conventional in the art. An example of such a dynamic debugger 15 is the INSURE++™ dynamic debugger product manufactured by Parasoft Corporation, Monrovia, Calif. (INSURE++™ is a trademark owned by Parasoft Corporation).

The parse tree 12 can be analyzed by the source code quality analyzer 16 which is constructed in accordance with the present invention prior to compilation by the compiler/linker 13 for automatically checking the quality of the source code 10. In the described embodiment, the source code quality analyzer 16 is a computer program written in the C programming language that is loaded into a main memory (not shown) and executed by a programmed digital computer (not shown). Embodiments in other programming languages are feasible. It is also envisioned that the source code quality analyzer 16 can be a special purpose computer formed on an integrated circuit chip (or set of chips) or executable computer code burned into a read-only memory (ROM) chip that can be read in by conventional means or as microcode. The computer source code for the source code quality analyzer 16 is set forth in the microfiche appendix.

The source code quality analyzer 16 accesses a rule base 17 that stores a set of rules for identifying quality concerns, as further described hereinbelow in Section I.B. The rule base 17 is preferably organized into files which are stored on a secondary storage device (not shown). Each rule in the rule base 17 is selected by the source code quality analyzer 16 and the parse tree 12 is searched for a match between a node representing those particular types of instructions being scrutinized for quality concerns reflected in the current rule. Upon encountering a matching node, the parse tree is further analyzed and the particular type of quality concern is identified. Error messages 18 are generated for describing the quality concern identified. The error messages 18 can be displayed as messages on a cathode ray tube (not shown), printed as documents on a printing device (not shown) or organized into files which are stored on a secondary storage device (not shown).

Optionally, the source code quality analyzer 16 can directly invoke the compiler/linker 13 or the dynamic debugger 15.

B. Rule Base Description

In the described embodiment, the rule base 17 comprises 24 rules describing quality-related concerns for source code 10 written in the C++ programming language. These rules are set forth in Table I wherein the first column identifies the rule number which corresponds to an item number as described in S. Meyers, *Effective C++ 50 Specific Ways to Improve Your Programs and Designs,* p. xi (Addison-Wesley 1992), as cited hereinabove, and the second column describes the quality-related concern addressed by the rule.

TABLE I

| Rule Number | Description |
| --- | --- |
| 02 | Prefer iostream.h to stdio.h. |
| 03 | Use new and delete instead of malloc and free. |
| 05 | Use the same form in corresponding calls to new and delete. |
| 06 | Call delete on pointer members in destructors. |
| 07 | Check the return value of new. |
| 08 | Adhere to convention when writing new. |
| 09 | Avoid hiding the global new. |
| 10 | Write delete if new is used. |
| 11 | Define a copy constructor and an assignment operator for classes with dynamically allocated memory. |
| 12 | Prefer initialization to assignment in constructors. |
| 13 | List members in an initialization list in the order in which they are declared. |
| 14 | Make destructors virtual in base classes. |
| 15 | Have operator = return a reference to this. |
| 16 | Assign to all data members in operator =. |
| 17 | Check for assignment to self in operator =. |
| 20 | Avoid data members in the public interface. |
| 22 | Pass objects by reference instead of by value. |
| 25 | Avoid overloading on a pointer and a numerical type. |
| 29 | Avoid returning "handles" to internal data from const member functions. |
| 30 | Avoid member functions that return pointers or references to members less accessible than themselves. |
| 31 | Never return a reference to a local object initialized by new within the function. |
| 37 | Never redefine an inherited nonvirtual function. |
| 38 | Never redefine an inherited default parameter value. |
| 39 | Avoid casts down the inheritance hierarchy. |

Each rule operates on nodes in the parse tree 12 to identify a pattern of nodes unique to the particular rule. Examples of source code 10 written in the C++ programming language and corresponding parse trees 12 (or parse tree segments) for each rule are respectively set forth in Appendices A and B.

In addition to the 24 rules used in the described embodiment, user-defined rules can be added by simply writing additional rule functions, such as each of the functions rule#.c as set forth in the microfiche appendix, where # indicates the rule number.

II. Method For Automatically Checking Computer Source Code Quality

Figure 2:
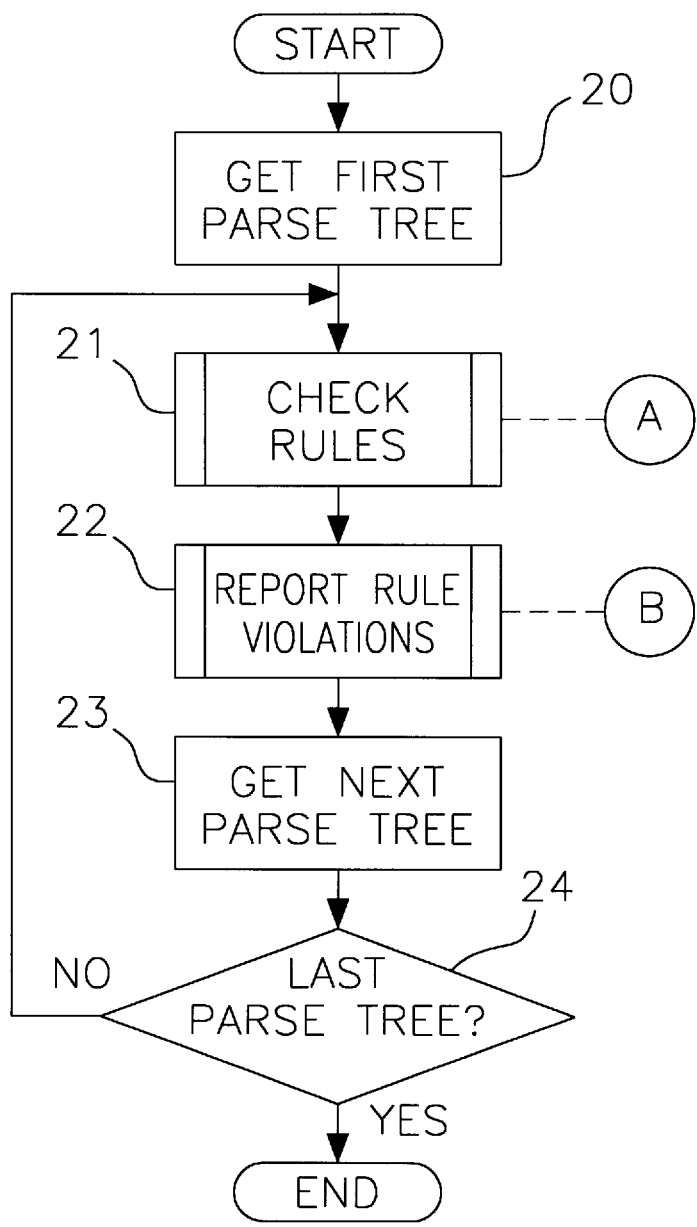
FIG. 2 is a flow diagram of a method for automatically checking computer source code quality in accordance with the present invention.

Referring to FIG. 2, a flow diagram of a method for automatically checking computer source code quality in accordance with the present invention is shown. The quality of the source code 10 is checked on an individual parse tree basis. One parse tree 12 is stored per file and each parse tree 12 is iteratively selected by a control loop (blocks 21–24) until all of the parse trees 12 have been selected. The method will now be described.

A first parse tree 12 is obtained (block 20). The instructions for the corresponding source code 10 as represented by nodes in the parse tree 12 are checked for rule violations (block 21) as further described hereinbelow in FIG. 3. Any rule violations found are reported to the user as error messages that identify the quality concern identified (block 22), as further described hereinbelow in FIG. 4. The next parse tree 12 is obtained (block 23), and if it is not the last parse tree 12 (block 24), control returns to the top of the control loop (blocks 21–24) for further processing. Otherwise, all parse trees 12 have been processed and the method terminates.

Figure 3:
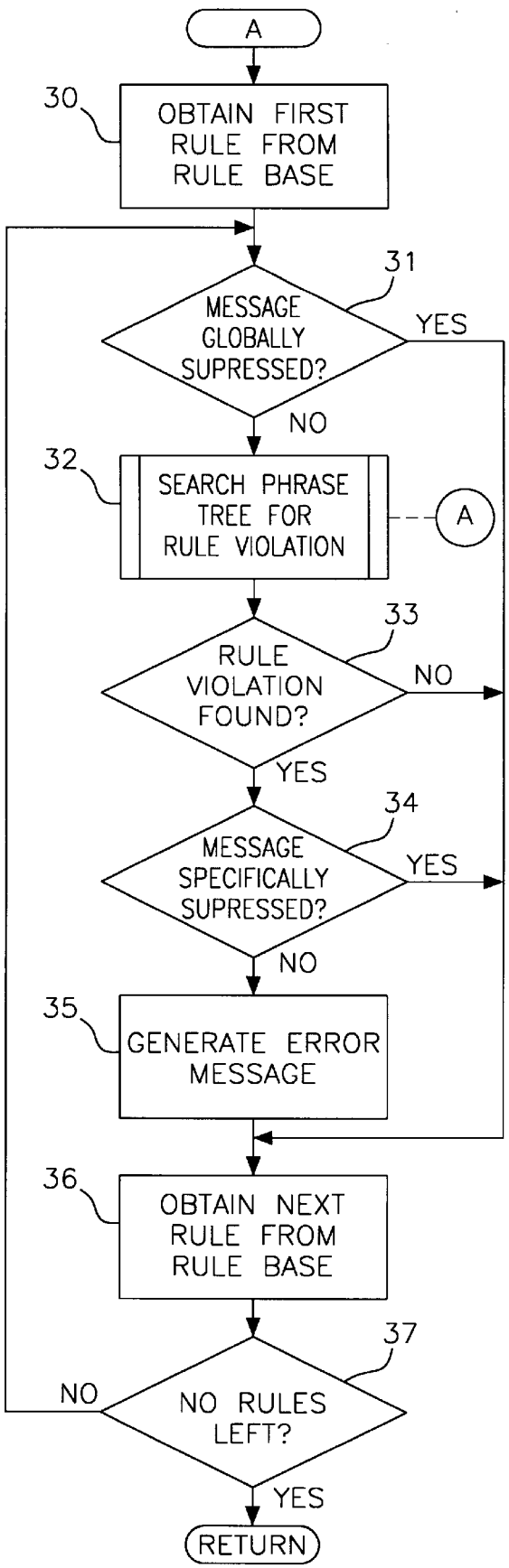
FIG. 3 is a flow diagram of a function for checking for rule violations.

Referring to FIG. 3, a flow diagram of the function for checking for rule violations (block 21) of FIG. 2 is shown. It operates by iteratively processing each rule in the rule base 17 using a main control loop (blocks 31–37) until all the rules have been processed. The function will now be described.

A first rule is obtained from the rule base 17 (block 30). If the error message associated with the obtained rule has been globally suppressed (block 31), all further processing of the rule is suspended and control continues towards the bottom of the control loop (blocks 31–37) by obtaining the next rule in the rule base 17 (block 36). Two types of message suppression are employed. Global message suppression operates in a context-free manner, that is, without reference to the parse tree 12. A rule that is globally suppressed is either in the list of suppressed rules or not. Specific message suppression operates in a context-sensitive manner. Information from the parse tree 12 is required for determining whether the rule is suppressed. For example, a rule could be specifically suppressed with reference to a particular class or file in the source code 10.

If a message associated with an obtained rule is not globally suppressed (block 31), the rule is further processed by first searching the parse tree for a rule violation (block 32) as further described hereinbelow in FIG. 5. If no rule violation is found (block 33), control resumes toward the bottom of the control loop (blocks 31–37) by obtaining the next rule in the rule base 17 (block 36).

Otherwise, if a rule violation has been found (block 33), yet the message has also been specifically suppressed (block 34), control resumes toward the bottom of the control loop (blocks 31–37) by obtaining the next rule in the rule base 17 (block 36). Otherwise, if the message has not been specifically suppressed for the current rule (block 34), an error message is generated (block 35) and the next rule in the rule base 17 is obtained (block 36). If there are still rules left in the rule base 17 (block 37), control continues at the top of the control loop (blocks 31–37) for further processing. Otherwise, if no rules are left (block 37), the function returns.

Figure 4:
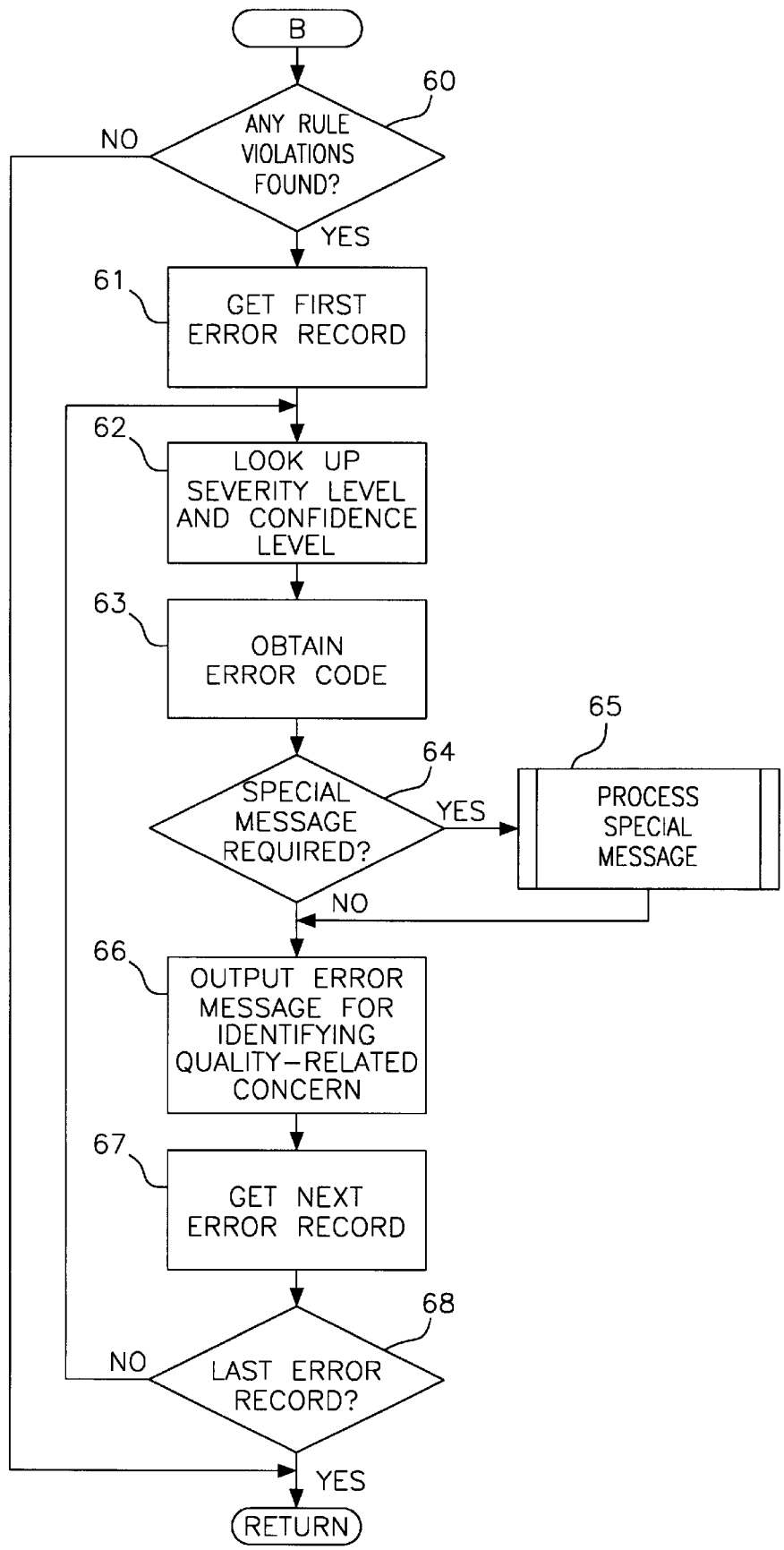
FIG. 4 is a flow diagram of a function for reporting rule violations.

Referring to FIG. 4, a flow diagram of the function for reporting rule violations (block 22) of FIG. 2 is shown. It operates by iteratively processing each rule violation using a main control loop (blocks 62–68) until all rule violations have been processed. The function will now be described.

If no rule violations are found in the parse tree 12 corresponding to the source code 10 (block 60), no error messages are necessary and the function returns. Otherwise, if there are rule violations (block 60), the error record describing the first rule violation for the quality concern identified is obtained (block 61). There is one error record for each particular rule violation. In the described embodiment, the error record comprises an error code for identifying the rule violation, a severity level for indicating its seriousness and a confidence level for providing a level of certainty that the rule has been violated. Other types of information for the error record are feasible. The computer source code defining the data structure describing the error record is set forth in the microfiche appendix.

The severity level and the confidence level are looked up from the error record (block 62) and the particular error code is obtained (block 63). Some of the rule violations require specialized error messages for describing specific program values obtained from the parse tree 12. If based on the error code a special message is required (block 64), the instructions for processing the special message are performed (block 65). A error message for identifying the quality-related concern is output (block 66) and the error record for the next rule violation is obtained (block 67). If there are still error records left (block 68), control continues at the top of the control loop (blocks 62–68) for further processing. Otherwise, if no error records are left (block 68), the function returns.

Figure 5:
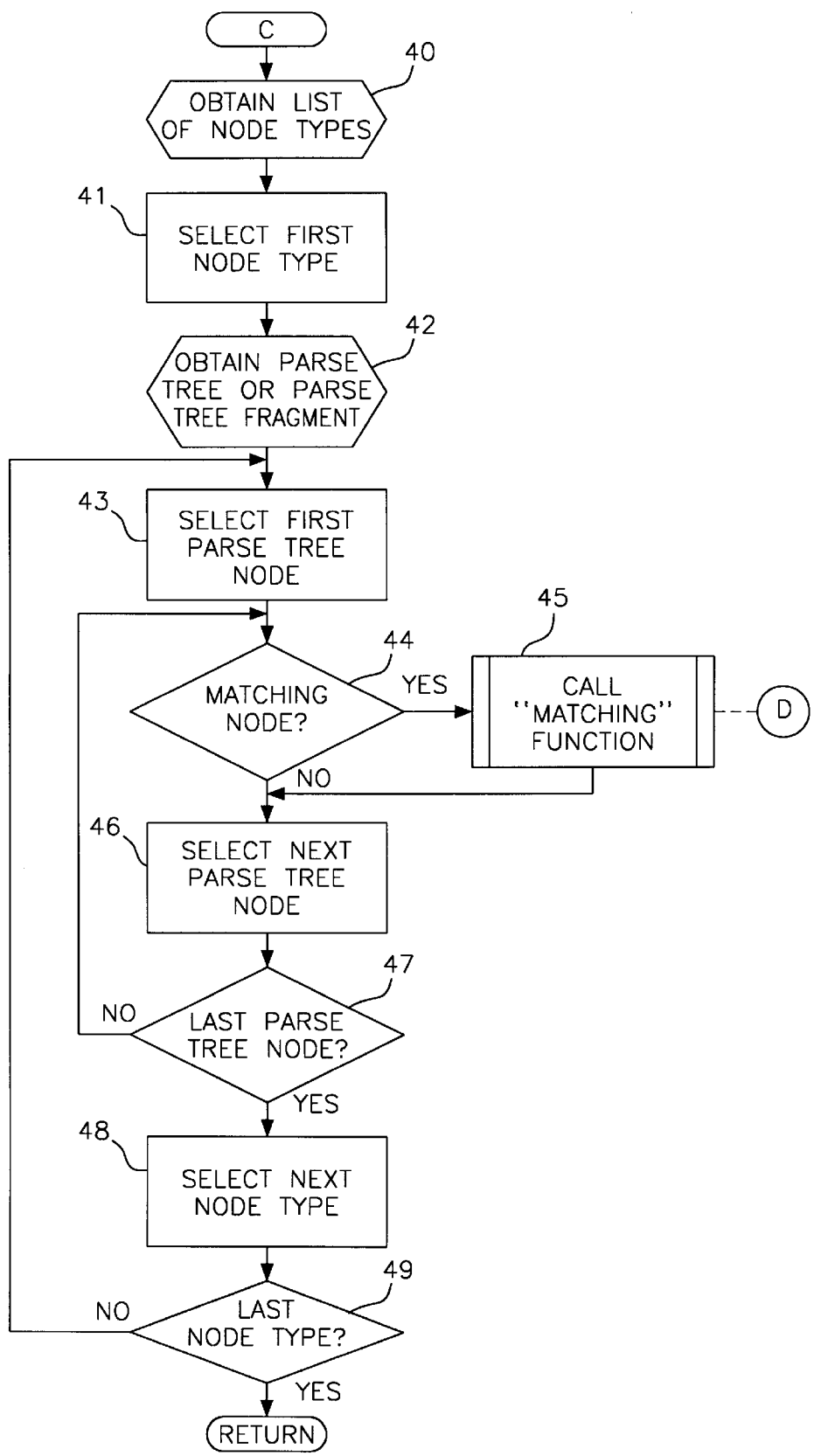
FIG. 5 is a flow diagram of a function for searching a parse tree for a rule violation.

Referring to FIG. 5, a flow diagram of the function for searching a parse tree for a rule violation (block 32) of FIG. 3 is shown. It operates using a pair of nested control loops that iteratively process each node type (blocks 43–49) and parse tree node (blocks 44–47). The function will now be described.

A list of node types is obtained for the current rule (block 40) and a first node type is selected from the list (block 41). A parse tree 12 (or parse tree fragment), such as described hereinabove in Section I.B., is obtained (block 42). The first node in the parse tree is selected (block 43) and if the selected parse tree node matches the selected node type (block 44), a "matching function" associated with the current rule is called (block 45), as further described hereinbelow in FIG. 6.

Otherwise, if the parse tree node does not match the node type (block 44), the next node in the parse tree is selected (block 46). If it is not the last node in the parse tree 12 (or parse tree fragment) (block 47), control returns to the top of the inner control loop (block 44–47) for further processing. Otherwise, if the last parse tree node has been selected (block 47), the next node type is selected from the list of node types for the current rule (block 48). If the last node type has not been selected (block 49), control returns to the top of the outer control loop (blocks 43–49) for further processing. Otherwise, if the last node type has been selected (block 49), the function returns.

Figure 6:
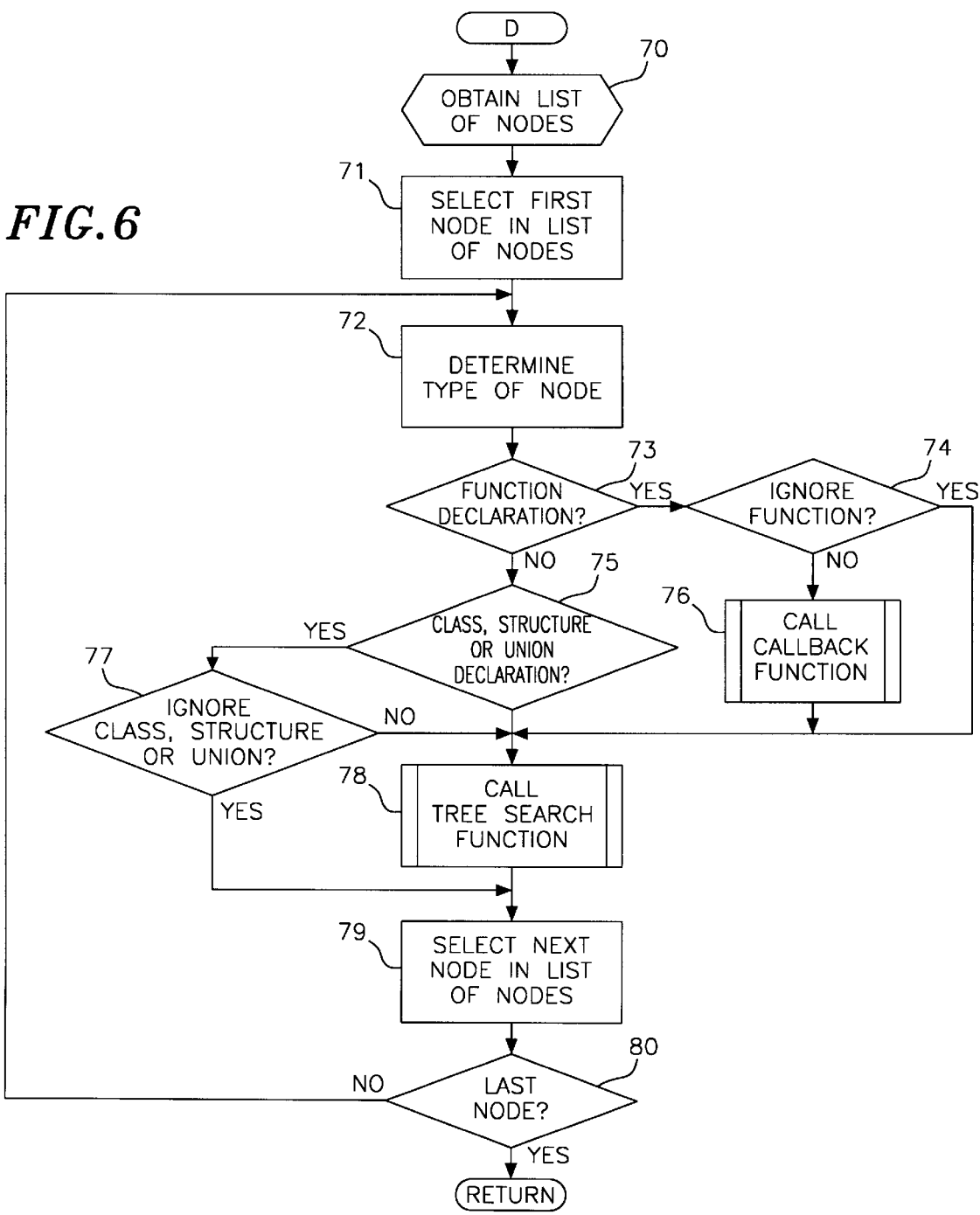
FIG. 6 is a flow diagram of a "matching function" associated with a current rule.

Referring to FIG. 6, a flow diagram of the "matching function" associated with the current rule (block 45) of FIG. 5 is shown. It operates by iteratively processing each node in a list of nodes for describing the characteristics of the particular rule from the rule base 17 using a main control loop (blocks 72–80) until all the nodes have been processed. The function will now be described.

The list of nodes for the particular rule is obtained (block 70) and the first node in the list of nodes is selected (block 71). The type of the selected node is determined (block 72). If the node corresponds to a function declaration (block 73) yet the function should be ignored (block 74), control resumes toward the bottom of the control loop (blocks 72–80) by calling a tree search function (block 78) as further described hereinbelow. A function is ignored (block 74) as a form of suppression based on the context of the match between the parse tree node and the node type (block 44 of FIG. 5). The structure of the parse tree 12 contains inherent ambiguities which can result in false rule violation detection without suppression.

If the function is not ignored (block 74), the callback function for a potential violation of the particular rule is called (block 76). Each rule has an associated callback function that is called whenever a particular event takes place. It is a generic mechanism for registering the rule violation by processing the callback function as a type of interrupt handler. Once a rule violation has been determined, the information needed to record an error record is stored.

Each rule in the rule base 17 is used to check the source code 10 for a violation of a quality-related concern through an iterative search of the parse tree 12. Several factors can define the particular event which triggers the callback function. In the most general case, this can be the existence of a particular type of node, but can also include a particular sequence or ordering of node types. The callback function specifies the types of nodes that must be matched and which are irrelevant. Other node-based strategies are feasible. The computer source code for the callback functions used in the described embodiment is set forth in the microfiche appendix and is organized by rule numbers matching those set forth in Table I hereinabove.

If the node corresponds to neither a function declaration (block 73) nor a class, structure or union declaration (block 75), the tree search function is called (block 78). Similarly, if the node corresponds to a class, structure or union declaration (block 75) yet the class, structure or union should not be ignored (block 77), the tree search function is called (block 78). Like a function, the class, structure or union is not ignored (block 77) as a form of suppression based on the context of the match between the parse tree node and the node type (block 44 of FIG. 5). However, if the class, structure or union is ignored (block 77), control resumes toward the bottom of the control loop (blocks 72–80) by selecting the next node in the list of nodes (block 79).

The tree search function (block 78) is necessitated by the structure of the parse tree 12 for helping to guarantee the correct context of a potential rule violation whenever a composite type is found, such as a function, class, structure or union. The function recursively strips fields from nodes in the parse tree 12 until it finds a particular type of token relevant to the current rule. In the described embodiment, this function comprises a case statement for selecting particular types of nodes followed by performing instructions on the corresponding node, although other methods are feasible.

After the tree search function has been called (block 78), the next node in the list of nodes is selected (block 79). If there are still nodes left (block 80), control continues at the top of the control loop (blocks 72–80) for further processing. Otherwise, if no nodes are left (block 80), the function returns.

While various embodiments of the invention have been particularly shown, it will be understood by those skilled in the art that the various changes in form and detail may be made without departing from the scope and spirit of the present invention, wherein:

What is claimed is:

1. A method using a computer for automatically checking the quality of computer source code based on rules for identifying quality concerns, the computer source code comprising instructions for execution on the computer, each of the instructions being represented by at least one node stored in a parse tree wherein each node has a node type and each of the rules is represented by at least one such node type, each of the rules being further represented by a matching function associated with at least one of the node types for the rule, the matching function iterattively processing a list of nodes for describing the characteristics of the rule, both the parse tree and the rules being stored in the computer, comprising the steps of:

checking for a violation of one of the rules by examining each of the instructions as represented by nodes in the parse tree;

obtaining a list of node types for the rule being checked;

searching for nodes in the parse tree having a node type matching one of the node types in the list of node types;

performing the matching function associated with the matching node type for determining whether the rule has been violated; and generating an error message for describing the quality concern identified whenever such a rule violation is found in the computer source code.

2. A method according to claim 1, further comprising the steps of:

obtaining the list of nodes for the matching function;

selecting each node from the list of nodes; and determining the type of selected node.

3. A method using a computer for automatically checking the quality of computer source code based on rules for identifying quality concerns, the computer source code comprising instructions for execution on the computer, each of the instructions being represented by at least one node stored in a parse tree, wherein the type of node selected represents a composite type comprising a plurality of nodes in the parse tree, both the parse tree and the rules being stored in the computer, comprising the steps of:

checking for a violation of one of the rules by examining each of the instructions as represented by nodes in the parse tree;

generating an error message for describing the quality concern identified whenever such a rule violation is found in the computer source code; and performing a tree search function for recursively stripping fields from each of the plurality of nodes to obtain a token used to ensure correct rule violation identification.

4. A method using a computer for automatically checking the quality of computer source code based on rules for identifying quality concerns, the computer source code comprising instructions for execution on the computer, each of the instructions being represented by at least one node stored in a parse tree, both the parse tree and the rules being stored in the computer, comprising the steps of:

checking for a violation of one of the rules by examining each of the instructions as represented by nodes in the parse tree;

storing information for indicating parse tree context into an error record for use in describing the quality concern identified, wherein the error record comprises a severity level for indicating the seriousness of the rule violation;

determining a severity level whenever such a rule violation is found in the computer source code;

indicating the severity level; and generating an error message for describing the quality concern identified whenever such a rule violation is found in the computer source code.

5. A method using a computer for automatically checking the quality of computer source code based on rules for identifying quality concerns, the computer source code comprising instructions for execution on the computer, each of the instructions being represented by at least one node stored in a parse tree, both the parse tree and the rules being stored in the computer, comprising the steps of:

checking for a violation of one of the rules by examining each of the instructions as represented by nodes in the parse tree;

storing information for indicating parse tree context into an error record for use in describing the quality concern identified, wherein the error record comprises a confidence level for providing a level of certainty that the rule has been violated;

determining a confidence level whenever such a rule violation is found in the computer source code; and indicating the confidence level; and generating an error message for describing the quality concern identified whenever such a rule violation is found in the computer source code.

6. A method using a computer for automatically checking the quality of computer source code based on rules for identifying quality concerns, the computer source code comprising instructions for execution on the computer, each of the instructions being represented by at least one node stored in a parse tree, both the parse tree and the rules being stored in the computer, comprising the steps of:

checking for a violation of one of the rules by examining each of the instructions as represented by nodes in the parse tree;

storing information for indicating parse tree context into an error record for use in describing the quality concern identified, wherein the error record comprises an error code;

determining whether a special message is required based on the error code;

processing the special message; and generating an error message for describing the quality concern identified whenever such a rule violation is found in the computer source code.

7. A method using a computer for checking computer source code to identify violations of quality rules, the computer source code comprising instructions for execution on the computer, each quality rule comprising a set of node types, both the computer source code and the quality rules being stored in the computer, each quality rule further comprising a matching function for iterattively processing a list of nodes for describing the characteristics of the rule, comprising the steps of:

providing the instructions for the computer source code to the computer stored in a parse tree comprising at least one node having a node type for each instruction;

selecting such a quality rule for identifying whether the selected quality rule has been violated by the computer source code;

searching the parse tree node for a match between such a node in the parse tree having a node type that matches such a node type in the set of node types for the selected quality rule;

providing a list of node types for describing the types of nodes in the parse tree to search for identifying each rule violation;

comparing each node in the parse tree to each node type in the list of node types;

performing the matching function; and generating an error message for describing the violation for the selected quality rule.

8. A method according to claim 7, further comprising the steps of:

obtaining the list of nodes for the matching function and iterattively selecting a node from the list of nodes for processing;

determining the type of the node selected; and processing the node by recording information into an error record.

9. A method according to claim 8, wherein the node type is a function declaration, further comprising the steps of:

determining whether the function declaration is ignored; and performing a callback function if the function declaration is not ignored.

10. A method according to claim 8, wherein the node type is one of a class, structure or union declaration, further comprising the steps of:

determining whether the at least one of a class, structure or union declaration is ignored; and performing a callback function if the at least one of a class, structure or union declaration is not ignored.

11. A method according to claim 8, further comprising the step of:

performing a tree search function for recursively stripping fields from each of the nodes to ensure correct rule violation identification.

12. A method using a computer for checking computer source code to identify violations of quality rules, the computer source code comprising instructions for execution on the computer, each quality rule comprising a set of node types, both the computer source code and the quality rules being stored in the computer, comprising the steps of:

providing the instructions for the computer source code to the computer stored in a parse tree comprising at least one node having a node type for each instruction;

selecting such a quality rule for identifying whether the selected quality rule has been violated by the computer source code;

searching the parse tree for a match between such a node in the parse tree having a node type that matches such a node type in the set of node types for the selected quality rule;

generating an error message for describing the violation for the selected quality rule;

determining whether an error message should be suppressed; and suppressing the error message if so determined.

13. A method using a computer for checking computer source code to identify violations of quality rules, the computer source code comprising instructions for execution on the computer, each quality rule comprising a set of node types, both the computer source code and the quality rules being stored in the computer, comprising the steps of:

providing the instructions for the computer source code to the computer stored in a parse tree comprising at least one node having a node type for each instruction;

selecting such a quality rule for identifying whether the selected quality rule has been violated by the computer source code;

searching the parse tree for a match between such a node in the parse tree having a node type that matches such a node type in the set of node types for the selected quality rule;

generating an error message for describing the violation for the selected quality rule; and generating an error message comprising at least one of a severity level for indicating the seriousness of the rule violation or a confidence level for providing a level of certainty that the rule has been violated.

* * * * *